US008068791B2

(12) United States Patent
Kim

(10) Patent No.: US 8,068,791 B2
(45) Date of Patent: Nov. 29, 2011

(54) APPARATUS FOR PROTECTING RECEIVER IN TDD WIRELESS COMMUNICATION SYSTEM

(75) Inventor: Seong-Hun Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1085 days.

(21) Appl. No.: 11/738,691

(22) Filed: Apr. 23, 2007

(65) Prior Publication Data

US 2007/0248069 A1 Oct. 25, 2007

(30) Foreign Application Priority Data

Apr. 25, 2006 (KR) .................. 10-2006-0037259

(51) Int. Cl.
*H04B 1/44* (2006.01)
*H04B 1/46* (2006.01)
(52) U.S. Cl. ............... 455/87; 455/79; 455/80; 455/81; 455/82; 455/83
(58) Field of Classification Search ............. 455/78, 455/79, 80, 81, 82, 83
See application file for complete search history.

(56) References Cited

U.S. PATENT DOCUMENTS

| 5,193,218 | A  | * | 3/1993 | Shimo ............................. 455/80 |
| 5,486,797 | A  | * | 1/1996 | Suzuki .......................... 333/104 |
| 5,513,382 | A  | * | 4/1996 | Agahi-Kesheh et al. ........ 455/83 |
| 5,923,647 | A  | * | 7/1999 | Dolman et al. .................. 455/83 |
| 6,552,626 | B2 | * | 4/2003 | Sharpe et al. ................. 333/104 |
| 6,847,829 | B2 | * | 1/2005 | Tanaka et al. .............. 455/552.1 |
| 7,027,778 | B2 | * | 4/2006 | Ha et al. .......................... 455/78 |
| 7,239,853 | B2 | * | 7/2007 | Kearns ............................. 455/83 |
| 7,253,702 | B2 | * | 8/2007 | Kemmochi et al. ........... 333/133 |
| 7,545,759 | B2 | * | 6/2009 | Hayashi ....................... 370/295 |

FOREIGN PATENT DOCUMENTS

KR 10-2007-0003498 A 1/2007

* cited by examiner

*Primary Examiner* — Wen Huang
(74) *Attorney, Agent, or Firm* — Jefferson IP Law, LLP

(57) ABSTRACT

A Time Division Duplex (TDD) switch of a TDD wireless communication system is provided. By its unique arrangement, the TDD switch protects a receiver of the wireless system. The TDD switch includes an isolator connected to an output port of a transmitter, a first transmission line stub, connected between the isolator and a circulator, for transmitting a transmission signal received from the isolator when in a transmission mode, and for isolating a transmission path when in a reception mode, a first transmission line connected to the circulator, for isolating a reception path when in the transmission mode, and for supplying to a receiver a reception signal provided from an antenna connected to the circulator when in the reception mode, and a second transmission line stub connected between the first transmission line and an input port of the receiver in a stub form, for controlling the first transmission line to isolate the reception path when in the transmission mode, and for supplying the reception signal to the receiver when in the reception mode.

15 Claims, 6 Drawing Sheets

APPARATUS FOR PROTECTING RECEIVER IN TDD WIRELESS COMMUNICATION SYSTEM

PRIORITY

This application claims the benefit under 35 U.S.C. §119(a) to a Korean patent application filed in the Korean Intellectual Property Office on Apr. 25, 2006 and assigned Serial No. 2006-37259, the entire disclosure of which is hereby incorporated by reference.

BACKGROUND OF THE INVENTION

1. Field of the Invention

The present invention relates to a Time Division Duplex (TDD) switch of a TDD wireless communication system. More particularly, the present invention relates to an apparatus for protecting a receiver when a high-power transmission signal is incorrectly introduced into the receiver due to erroneous operations such as a malfunction of the TDD switch.

2. Description of the Related Art

In a Time Division Duplex (TDD) wireless communication system, a TDD switch is generally used for mode changes between a transmission mode and a reception mode. The TDD switch operates in response to a TDD control signal of the wireless communication system.

FIG. 1 is a diagram illustrating a conventional location of a TDD switch in a TDD wireless communication system.

Referring to FIG. 1, a TDD switch 107 is connected to a Power Amplifier (PA) 103, an antenna 111, and a Low Noise Amplifier (LNA) 115.

When the wireless communication system operates in a transmission mode, a signal from transmitter 101 is amplified to a high-power signal through the PA 103 and is then radiated through the antenna 111 via a transmit port 105 and an antenna port 109. The TDD switch 107 operates in the transmission mode and thus isolates the transmitter 101 from a receiver 117. Therefore, the receiver 117 can be protected against the high-power signal of the transmitter 101.

When the wireless communication system operates in the reception mode, the power signal sent from the antenna 111 is received through the antenna port 109 and a receive port 113. The TDD switch 107 operates in the reception mode and thus enables the received power signal to be sent to the receive port 113. The received power signal has significantly low power due to attenuation and noise. Therefore, the power signal is amplified by the LNA 115 which amplifies a signal while minimizing noise. The amplified power signal is received by the receiver 117.

FIG. 2 is a diagram illustrating a conventional TDD switch.

Referring to FIG. 2, the conventional TDD switch includes an isolator 203, a circulator 205, a λ/4 transmission line 209, a pin diode 211, and so on. The λ/4 transmission line 209 and the pin diode 211 are interconnected between a receive port 213 and the circulator 205.

In the conventional TDD switch shown in FIG. 2, the λ/4 transmission line 209 and the pin diode 211 are connected in a three connection configuration. The number of connection configurations of the λ/4 transmission line 209 and the pin diode 211 may be determined through simulation or theoretical calculation. In addition, the number of connection configurations may vary depending on the extent of isolation.

In the TDD wireless communication system, a transmitter including a PA may be connected to a transmit port 201. A receiver including an LNA may be connected to the receive port 213. Furthermore, an antenna may be connected to an antenna port 207 of the TDD switch.

The isolator 203 transmits a power signal only in one direction and is located between the transmit port 201 and the circulator 205. The isolator 203 is designed to pass only the power signal transmitted from the transmit port 201. Furthermore, the isolator 203 acts as a terminator for an external power signal that is reflected and returned. For example, when the power signal is not successfully radiated from the antenna and is thus reversely introduced, the circuit of the transmit port 201 may be damaged by the reflected power signal. Therefore, the isolator 203 protects the circuit of the transmit port 201.

The circulator 205 is a 3-port circuit element for branching the power signal. A resonance plate and a magnetic substance (e.g., ferrite) are placed inside the circulator 205 having a shape in which three ports are arranged by 120 degrees. The circulator 205 incurs an approximately 0.3 dB path loss when passing the power signal in a direction from the isolator 203 to the antenna port 207. Also, the circulator 205 isolates the power signal by a specific level (about 20 dB) in another direction from the circulator 205 to the receiver port 213. For example, when the TDD control signal operates in the transmission mode, the power signal amplified by the transmitter exhibits an approximately 0.3 dB path loss while passing through the circulator 205 and is then radiated through the antenna via the antenna port 207. In the direction from the circulator 205 to the receiver port 213, the power signal is attenuated by a certain level (about 20 dB). Although the power signal is attenuated by the specific level (about 20 dB), the receive port 213 may be damaged when the attenuated signal is transmitted to the receive port 213.

The TDD control signal is used to control the transmitter and the receiver of the TDD wireless communication system. In response to the TDD control signal, the transmitter amplifies a power signal to be transmitted and then radiates the amplified power signal to the antenna. In addition, the TDD control signal is used to control a bias circuit 221 which regulates a Direct Current (DC) bias supplied to the pin diode 211. The DC bias is supplied to the pin diode 211 through a transmission line, but this does not affect wireless communication characteristics. The pin diode 211 acts as a part of the TDD switch according to the DC bias. A capacitor (not shown) is provided to block the DC bias. Although not shown, it will be assumed that the capacitor for blocking the DC bias exists throughout FIGS. 2 to 6.

According to the transmission line theory, when an output port of a transmission line is open to ground, the impedance of the input port of the transmission line is expressed as $Z=-jZo \cot \beta l$. When the output port of the transmission line is shorted to ground, the impedance of the input port of the transmission line is expressed as $Z=-jZo \tan \beta l$. When the output port of the transmission line is connected to a 50 ohm transmission line, the impedance of the input port of the transmission line is expressed as $Z=Zo=50$ ohm. Here, $\beta=2\pi/\lambda$, and l is the length of the transmission line. As known, waves have the same amplitudes at λ/4, 3λ/4, 5λ/4, 7λ/4, and so on. Hence, the λ/4 transmission line 209 may be generalized as a (λ/4)*(2m+1) transmission line [m=0,1,2,3, . . . ]. The λ/4 transmission line 209 corresponds to a (λ/4)*(2m+1) transmission line [m=0, 1,2,3, . . . ], where m is 0.

The pin diode 211 and the 50 ohm transmission line (receiver) are connected in parallel to the output port of the λ/4 transmission line 209. The pin diode 211 acts as a part of the TDD switch according to the DC bias. When the impedance of the pin diode 211 becomes nearly 0 (short-circuited), the parallel impedance between the pin diode 211 and the 50 ohm transmission line becomes nearly 0 (short-circuited). On the other hand, when the impedance of the pin diode 211 becomes nearly infinite (open-circuited), the parallel impedance between the pin diode 211 and the 50 ohm transmission line becomes nearly 50 ohm. Therefore, impedance changes in the pin diode 211 according to the DC bias allow the output port of the λ/4 transmission line 209 to become substantially shorted to ground or substantially connected only to the 50 ohm transmission line.

When the pin diode 211 is substantially open to ground, the output port of the λ/4 transmission line 209 is nearly connected only to the 50 ohm transmission line. Thus, according to the above expression of Zo=50 ohm, the impedance Z of the input port of the λ/4 transmission line 209 becomes nearly 50 ohm.

When the output port of the λ/4 transmission line 209 is substantially shorted to ground, according to the above expression of $Z=-jZo \tan \beta l$ where $\beta=2\pi/\lambda$, and $l=(\lambda/4)*(2m+1)[m=0,1,2,3,\ldots]$, the impedance Z of the input port of the λ/4 transmission line 209 becomes nearly infinite (open-circuited).

In the transmission mode, when the TDD control signal is transmitted to the bias circuit 221, the bias circuit 221 supplies a forward DC bias to the pin diode 211. The forward DC bias allows the impedance of the pin diode 211 to become nearly 0 (short-circuited). Since the output port of the λ/4 transmission line 209 is connected to the pin diode 211, the impedance of the output port of the λ/4 transmission line 209 also becomes nearly 0 (short-circuited). Thus, the output port of the λ/4 transmission line 209 becomes substantially shorted to ground. According to the characteristic of the λ/4 transmission line 209, the impedance of the input port of the λ/4 transmission line 209 (a port nearest to the circulator 205) changes to be opposite to the impedance of the output port of the λ/4 transmission line 209 and thus becomes nearly infinite (open-circuited). Hence, the receive port 213 can be protected against the power signal while the TDD control signal operates in the transmission mode.

In the reception mode, when the TDD control signal is transmitted to the bias circuit 221, the bias circuit 221 supplies a reverse DC bias to the pin diode 211. The reverse DC bias allows the impedance of the pin diode 211 to become nearly infinite (open-circuited). Since the output port of the λ/4 transmission line 209 is connected to the pin diode 211 and the 50 ohm transmission line (receiver), when the impedance of the pin diode 211 becomes nearly infinite (open-circuited), the impedance of the output port of the λ/4 transmission line 209 becomes 50 ohm, and the impedance of the input port of the λ/4 transmission line 209 also becomes 50 ohm. Therefore, a path that spans from the antenna port 207 to the receive port 213 via the circulator 205 is not affected. Accordingly, most of the power signal received through the antenna can be input to the receive port 213.

The TDD wireless communication system may operate correctly without any problem. However, when the TDD switch incorrectly operates, the TDD wireless communication system may operate in the transmission mode while the TDD switch operates in the reception mode. In this case, the power signal may not be completely isolated by the circulator 205 and thus may be introduced to the receiver, which may lead to damage in the circuit of the receiver.

Furthermore, a cable connected to the antenna port 207 may be open when the TDD switch is turned off, or a high-power signal may be reflected when a Voltage Standing Wave Ratio (VSWR) of the circuit of the transmitter increases due to impedance mismatching. In this case, most of the reflected high-power signal is introduced into the receiver, which may damage the circuit of the receiver. Impedance matching is used to reduce performance degradation caused by an impedance difference between two separate connection ports. The VSWR represents a reflection amount of the power signal transmitted to the antenna port 207.

The DC bias of the bias circuit 221 cannot be supplied to the pin diode 211 when the TDD switch is turned off. This is similar to the case where the reverse DC bias is supplied to the pin diode 211. Thus, the TDD switch operates in the reception mode.

The conventional TDD wireless communication system cannot operate correctly when the aforementioned problems occur mostly because the introduction of the power signal into the receiver may damage the circuit of the receiver. Accordingly, there is a need for a TDD switch that can protect the receiver even when the TDD wireless communication system operates incorrectly.

SUMMARY OF THE INVENTION

The present invention has been made to address the above-mentioned problems and/or disadvantages. Accordingly, an object of the present invention is to provide a Time Division Duplex (TDD) switch that protects a receiver in a wireless communication system.

Another object of the present invention is to provide a TDD switch that protects the receiver even when the TDD wireless communication system operates incorrectly due to errors.

According to one aspect of the present invention, an apparatus for protecting a receiver in a wireless communication system is provided. The apparatus includes a TDD switch in a wireless communication system comprising an isolator connected to an output port of a transmitter, a first transmission line stub which is connected between the isolator and a circulator, transmits a transmission signal received from the isolator when in a transmission mode, and isolates a transmission path when in a reception mode, a first transmission line which is connected to the circulator, isolates a reception path when in the transmission mode, and supplies to a receiver a reception signal provided from a antenna feed line connected to the circulator when in the reception mode and a second transmission line stub which is connected between the first transmission line and an input port of the receiver in a stub form, controls the first transmission line to isolate the reception path when in the transmission mode, and supplies the reception signal to the receiver when in the reception mode.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention relates to a Time Division Duplex (TDD) switch for protecting a receiver of a TDD wireless communication system when operating not only correctly but also incorrectly due to errors.

Figure 3:
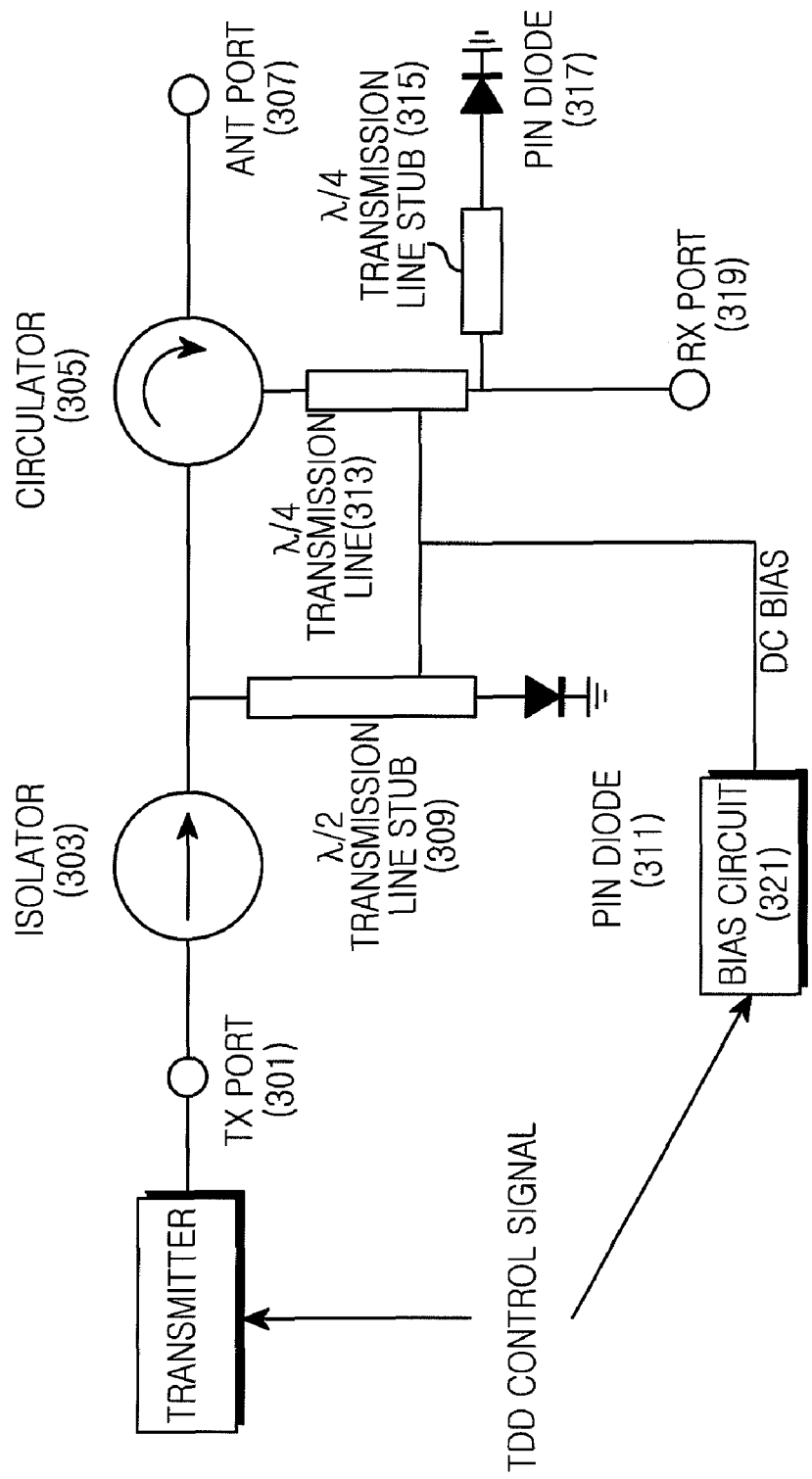
FIG. 3 is a diagram illustrating a TDD switch according to an exemplary embodiment of the present invention.

FIG. 3 is a diagram illustrating a TDD switch according to an exemplary embodiment of the present invention.

Referring to FIG. 3, the TDD switch includes an isolator 303, a circulator 305, pin diodes 311 and 317, a λ/4 transmission line 313, a λ/4 transmission line stub 315, and a λ/2 transmission line stub 309. The λ/2 transmission line stub 309 and the pin diode 311 are connected between the isolator 303 and the circulator 305, thereby forming a TDD switch. The λ/4 transmission line 313, the λ/4 transmission line stub 315, and the pin diode 317 are connected between the circulator 305 and a receive port 319, thereby forming another TDD switch. A plurality of TDD switches may be present, and the number of TDD switches may be determined through simulation or theoretical calculation. This will be described below with reference to FIGS. 5 and 6.

A transmission line is provided to transmit a high frequency signal. In a wireless communication system, the use of the high frequency signal may allow the transmission line itself to have a characteristic of a specific circuit element. In general, a transmission line stub having a specific length is perpendicularly attached to the transmission line. According to a connection state between the transmission line stub and ground, the transmission line stub may be either an open stub or a shorted stub. Similar to the transmission line, when used in a high frequency circuit, the transmission line stub may also have a characteristic of a specific circuit element. In addition, a λ/4 transmission line stub has the same characteristic as a λ/4 transmission line.

According to transmission line theory, when the output port of the transmission line stub is not connected to ground (i.e., open stub), the impedance of the input port of the transmission line stub is expressed as $Z=-jZ_o \cot \beta l$. Further, when the output port of the transmission line stub is connected to ground (i.e., shorted stub), the impedance of the input port of the transmission line stub is expressed as $Z=-jZ_o \tan \beta l$. Here, $\beta=2\pi/\lambda$, and l is the length of the transmission line stub. As known, waves have the same amplitudes at 0, λ/2, λ, 3λ/2, 2λ, and so on. Hence, the λ/2 transmission line stub 309 may be generalized as a (λ/2)*m transmission line stub [m=0,1,2, 3, . . . ]. The λ/2 transmission line stub 309 corresponds to a (λ/2)*m transmission line stub [m=0,1,2,3, . . . ], where m is 1.

The output port of the λ/2 transmission line stub 309 is connected to the pin diode 311. According to a DC bias of a bias circuit 321, the pin diode 311 acts as a part of a TDD switch. Therefore, impedance changes in the pin diode 311 according to the DC bias allow the output port of the λ/2 transmission line stub 309 to become nearly shorted to or open to ground.

When the output port of the λ/2 transmission line stub 309 becomes substantially open to ground, according to the above expressions of $Z=-jZ_o \cot \beta l$, $\beta=2\pi/\lambda$, and l=(λ/2)*m transmission line stub [m=0,1,2,3, . . . ], the impedance Z of the input port of the λ/2 transmission line stub 309 becomes nearly infinite (open-circuited). Since the input port of the λ/2 transmission line stub 309 and a 50 ohm transmission line are connected in parallel to the isolator 303, when the impedance Z of the input port of the λ/2 transmission line stub 309 becomes nearly infinite (open-circuited), an input impedance viewed from the isolator 303 towards the circulator 305 becomes 50 ohm.

On the other hand, when the output port of the λ/2 transmission line stub 309 becomes substantially shorted to ground, according to the above expressions $Z=-jZ_o \cot \beta l$, $\beta=2\pi/\lambda$, and l=(λ/2)*m transmission line stub [m=0,1,2, 3, . . . ], the impedance Z of the input port of the λ/2 transmission line stub 309 becomes nearly 0 (short-circuited).

In the transmission mode, when the TDD control signal is transmitted to the bias circuit 321, the bias circuit 321 supplies a reverse DC bias to the pin diodes 311 and 317. The reverse DC bias allows each of the impedances of the pin diodes 311 and 317 to become nearly infinite (open-circuited). Since the pin diode 311 located between the isolator 303 and the circulator 305 is connected to the output port of the λ/2 transmission line stub 309, the impedance of the output port of the λ/2 transmission line stub 309 also becomes nearly infinite (open-circuited). Hence, the output port of the λ/2 transmission line stub 309 becomes substantially open to ground (open-circuited). Similar to the impedance of the output port of the λ/2 transmission line stub 309, according to the characteristic of the λ/2 transmission line stub 309, the impedance of the input port (a port nearest to the isolator 303) of the λ/2 transmission line stub 309 becomes nearly infinite (open-circuited). Accordingly, an input impedance viewed from the isolator 303 towards the circulator 305 becomes 50 ohm.

Figure 1:
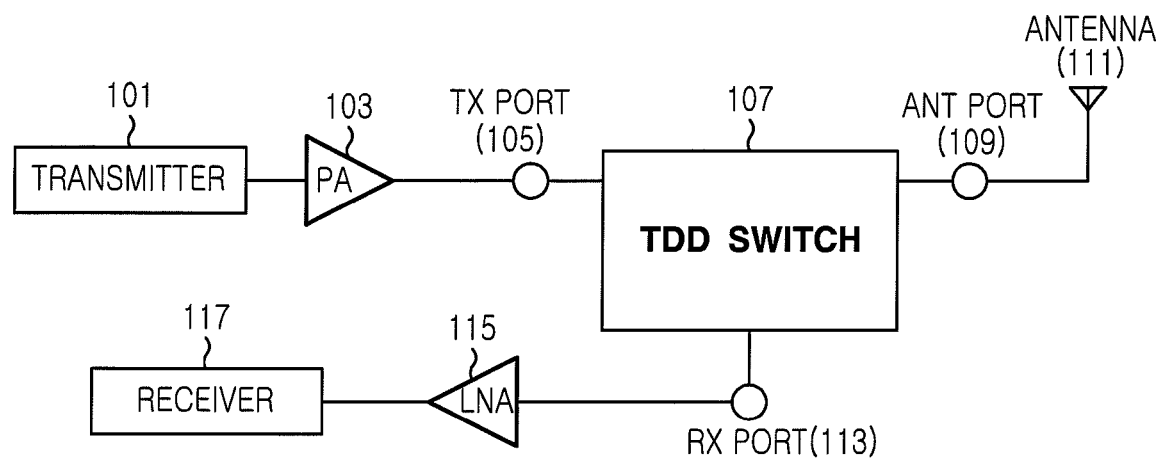
FIG. 1 is a diagram illustrating a conventional location of a Time Division Duplex (TDD) switch in a TDD wireless communication system.
Figure 2:
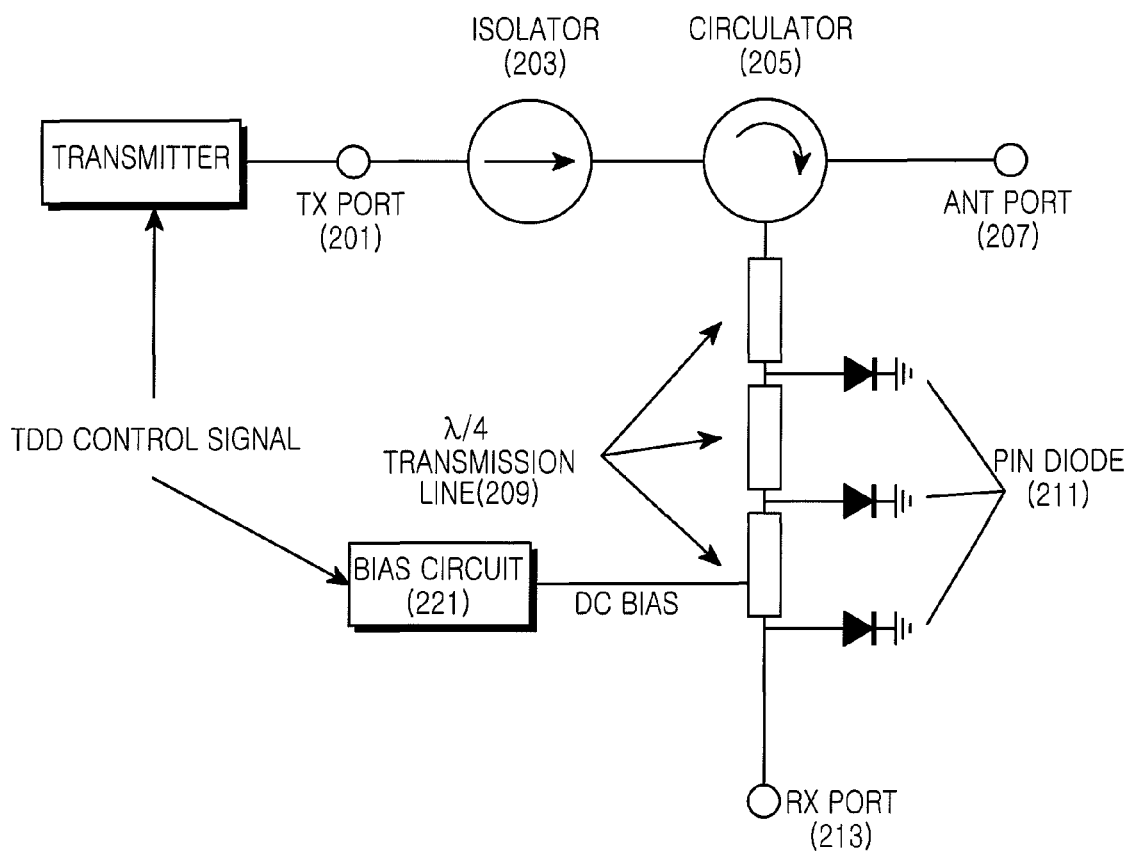
FIG. 2 is a diagram illustrating a conventional TDD switch.

When the TDD control signal operates in the transmission mode, the reverse DC bias allows the impedance of the pin diode 317 located between the circulator 305 and the receive port 319 to become nearly infinite (open-circuited). Since the pin diode 317 is connected to the output port of the λ/4 transmission line stub 315, the impedance of the output port of the λ/4 transmission line stub 315 also becomes nearly infinite (open-circuited). Hence, the output port of the λ/4 transmission line stub 315 becomes substantially open to ground (open-circuited). The impedance of the input port of the λ/4 transmission line stub 315 is nearly 0 (short-circuited), similar to that of the λ/4 transmission line 209 of FIG. 2. The impedance of the output port of the λ/4 transmission line 313 becomes nearly 0 (short-circuited) since it is a parallel impedance between the impedance of the input port of the λ/4 transmission line stub 315 and the impedance of the 50 ohm transmission line. The impedance of the input port (a port nearest to the circulator 305) of the λ/4 transmission line 313 becomes nearly infinite (open-circuited) according to the characteristic of the λ/4 transmission line 313. Therefore, it is possible to isolate most of the power signal to be supplied from the circulator 305 from the receive port 319 while the wireless communication system operates in the transmission mode, thereby protecting the circuit of the receiver.

Consequently, when the wireless communication system operates in the transmission mode, the $\lambda/2$ transmission line stub 309 and the pin diode 311 operate as if they do not exist, and the receive port 319 is protected by the $\lambda/4$ transmission line 313, the $\lambda/4$ transmission line stub 315, and the pin diode 317. Therefore, the wireless communication system can perform a transmission operation without damaging the receiver.

In the reception mode, when the TDD control signal is transmitted to the bias circuit 321, the bias circuit 321 supplies a forward DC bias to the pin diodes 311 and 317. The forward DC bias allows each of the impedances of the pin diodes 311 and 317 to become nearly 0 (short-circuited). Since the pin diode 311 located between the isolator 303 and the circulator 305 is connected to the output port of the $\lambda/2$ transmission line stub 309, the impedance of the output port of the $\lambda/2$ transmission line stub 309 also becomes nearly 0 (short-circuited). Hence, the output port of the $\lambda/2$ transmission line stub 309 becomes substantially shorted to ground (short-circuited). Similar to the impedance of the output port of the $\lambda/2$ transmission line stub 309, according to the characteristic of the $\lambda/2$ transmission line stub 309, the impedance of the input port (a port nearest to the isolator 303) of the $\lambda/2$ transmission line stub 309 becomes nearly 0 (short-circuited). Since the input port of the $\lambda/2$ transmission line stub 309 and the 50 ohm transmission line are connected in parallel to the isolator 303, when the impedance Z of the input port of the $\lambda/2$ transmission line stub 309 becomes nearly 0 (short-circuited), the input impedance viewed from the isolator 303 towards the circulator 305 becomes nearly 0 (short-circuited). If the TDD switch incorrectly operates, the TDD wireless communication system may operate in the transmission mode while the TDD switch operates in the reception mode. In this case, the high-power signal amplified by the transmitter and transmitted by transmission port 301 is reflected by the pin diode 311 and is returned to the isolator 303, thereby being terminated. Therefore, the circuit of the receiver can be protected.

When the TDD control signal operates in the reception mode, the forward DC bias also allows the impedance of the pin diode 317 located between the circulator 305 and the receive port 319 to become nearly 0 (short-circuited). Since the pin diode 317 is connected to the output port of the $\lambda/4$ transmission line stub 315, the impedance of the output port of the $\lambda/4$ transmission line stub 315 also becomes nearly 0 (short-circuited). Therefore, the output port of the $\lambda/4$ transmission line stub 315 becomes substantially shorted to ground (short-circuited). According to the characteristic of the $\lambda/4$ transmission line stub 315, the impedance of the input port of the $\lambda/4$ transmission line stub 315 changes to be opposite to the impedance of the output port of the $\lambda/4$ transmission line stub 315 and thus becomes nearly infinite (open-circuited). Since the input port of the $\lambda/4$ transmission line stub 315 and the 50 ohm transmission line are connected in parallel to the output port of the $\lambda/4$ transmission line 313, the impedance of the output port of the $\lambda/4$ transmission line 313 becomes 50 ohm. As a result, the impedance of the input port (a port nearest to the circulator 305) of the $\lambda/4$ transmission line 313 becomes 50 ohm according to the characteristic of the $\lambda/4$ transmission line 313.

Consequently, when the wireless communication system operates in the reception mode, according to the operations of the $\lambda/2$ transmission line stub 309 and the pin diode 311, an output of the isolator 303 is reflected, and the reflected output is returned to the isolator 303, thereby being terminated. Therefore, even if an abnormal output is produced from the isolator 303, the receive port 319 can be protected. In addition, the $\lambda/4$ transmission line 313, the $\lambda/4$ transmission line stub 315, and the pin diode 317 enable the receive port 319 to receive a signal received through the antenna port 307.

If the TDD switch operates incorrectly, the TDD wireless communication system may operate in the transmission mode while the TDD switch operates in the reception mode. In this case, the high-power transmission signal is reflected by the operations of the pin diode 311 and the $\lambda/2$ transmission line stub 309 and is thus returned to the isolator 303, thereby being terminated. Therefore, the circuit of the receiver can be protected.

A cable connected to the antenna port 307 may be open when the TDD switch is turned off, or a high-power signal may be reflected when a Voltage Standing Wave Ratio (VSWR) of the circuit of the antenna increases due to impedance mismatching. Even in this case, the pin diode 317, the $\lambda/4$ transmission line stub 315, and the $\lambda/4$ transmission line 313 operate in the same state as when the TDD switch operates in the transmission mode. Therefore, most of the power signal to be introduced into the receive port 319 is isolated, thereby protecting the circuit of the receiver.

Figure 4:
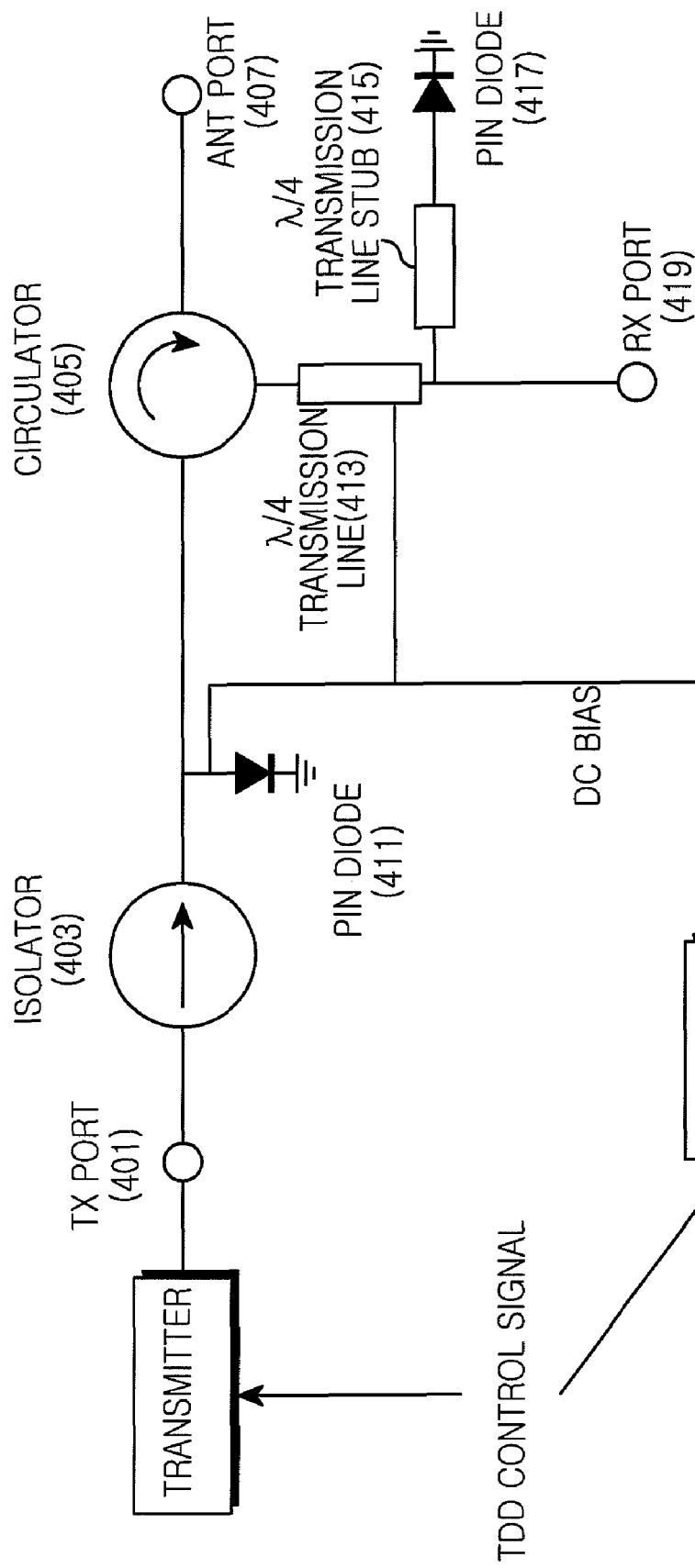
FIG. 4 is a diagram illustrating a TDD switch without a λ/2 transmission line stub according to an exemplary embodiment of the present invention.

FIG. 4 is a diagram illustrating a TDD switch without a $\lambda/2$ transmission line stub according to an exemplary embodiment of the present invention. Referring to FIG. 4, the TDD switch includes an isolator 403, a circulator 405, pin diodes 411 and 417, a $\lambda/4$ transmission line 413 and a $\lambda/4$ transmission line stub 415. The $\lambda/4$ transmission line 413, the $\lambda/4$ transmission line stub 415, and the pin diode 417 are connected between the circulator 405 and a receive port 419. The exemplary embodiment illustrated in FIG. 4 also includes a transmission port 401, an antenna port 407 and a bias circuit 421.

As illustrated in FIG. 4, an exemplary embodiment includes a generalized $(\lambda/2)*m$ transmission line stub [m=0, 1,2,3, . . . ] when m is 0. According to transmission line theory, the transmission line stub has a specific length, and waves have the same amplitudes at 0, $\lambda/2$, $\lambda$, $3\lambda/2$, $2\lambda$, and so on. Therefore, the $\lambda/2$ transmission line stub may be generalized as a $(\lambda/2)*m$ transmission line stub [m=0,1,2,3, . . . ]. As a result, a high frequency system such as the TDD wireless communication system has the same characteristic regardless of whether the $\lambda/2$ transmission line stub is absent or whether the transmission line stub has the length of $\lambda/2$, $\lambda$, $3\lambda/2$, $2\lambda$, and so on.

Accordingly, an exemplary TDD switch without the $\lambda/2$ transmission line stub as shown in FIG. 4 operates in the same manner as the TDD switch with the $\lambda/2$ transmission line stub 309 as illustrated in FIG. 3.

Figure 5:
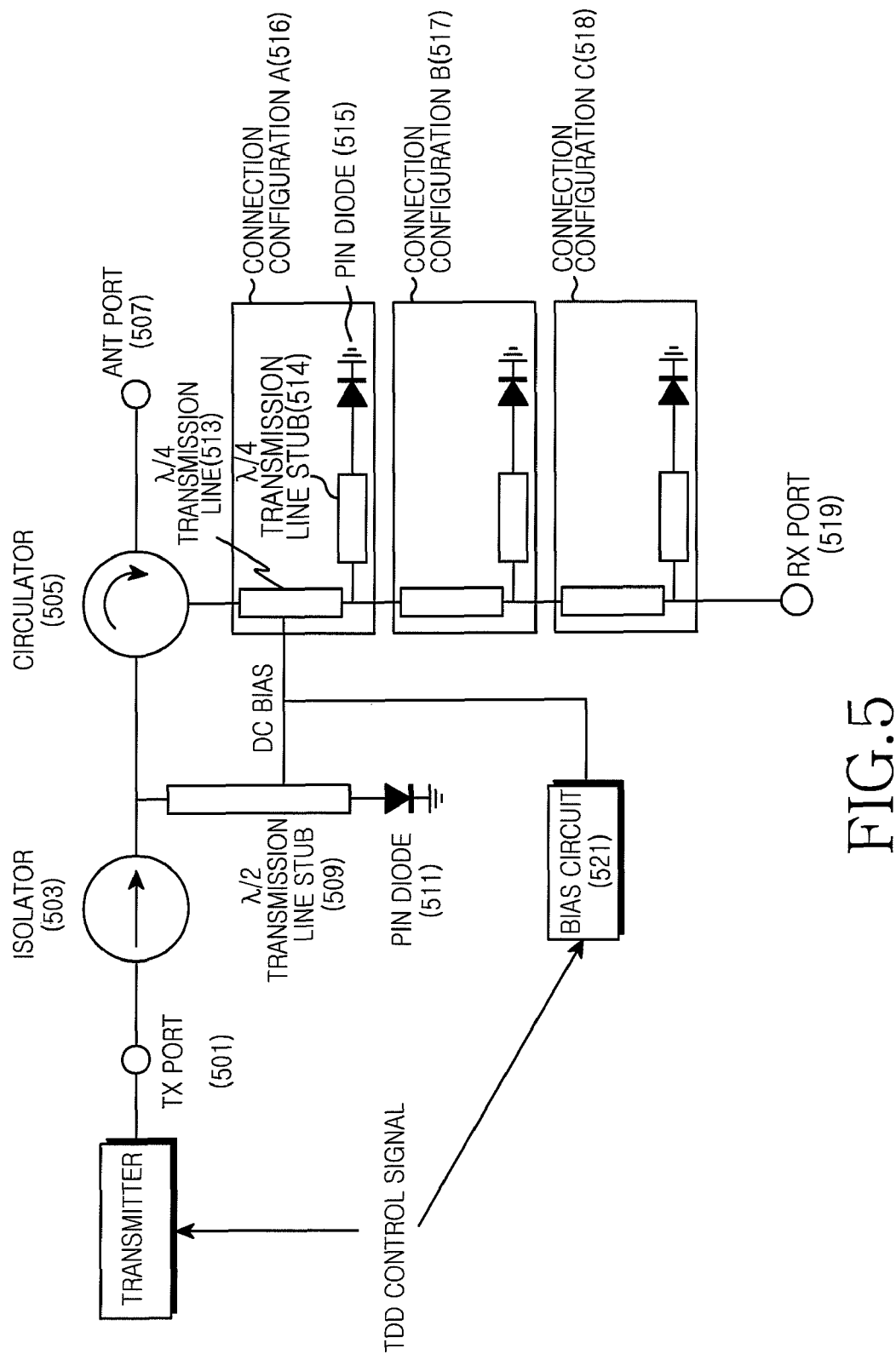
FIG. 5 is a diagram illustrating a TDD switch having three connection configurations which include a λ/4 transmission line, a λ/4 transmission line stub, and a λ/2 transmission line stub according to an exemplary embodiment of the present invention.

FIG. 5 is a diagram illustrating a TDD switch having three connection configurations each of which includes a $\lambda/4$ transmission line, a $\lambda/4$ transmission line stub, and a $\lambda/2$ transmission line stub according to an exemplary embodiment of the present invention.

Referring to FIG. 5, a connection configuration A 516 includes a $\lambda/4$ transmission line 513, a $\lambda/4$ transmission line stub 514, and a pin diode 515. In the connection configuration A 516, the function of the $\lambda/4$ transmission line 513 is similar to that of the $\lambda/4$ transmission line 313 of FIG. 3, and the function of the $\lambda/4$ transmission line stub 514 is similar to that of the $\lambda/4$ transmission line stub 315. In addition, the function of the pin diode 515 is similar to that of the pin diode 317 of FIG. 3. Likewise, connection configurations B 517 and C 518 each includes a $\lambda/4$ transmission line, a $\lambda/4$ transmission line stub, and a pin diode each having the same functions as those in the connection configuration A 516. As further illustrated in FIG. 5, an exemplary embodiment may also include a transmission port 501, an isolator 503, an antenna port 507, a λ/2 transmission line stub 509, a PIN diode 511 and a bias circuit 521.

The number of connection configurations may vary depending on the extent of isolation between a circulator 505 and a receive port 519. Further, the number of connection configurations may be determined through simulation or theoretical calculation.

Figure 6:
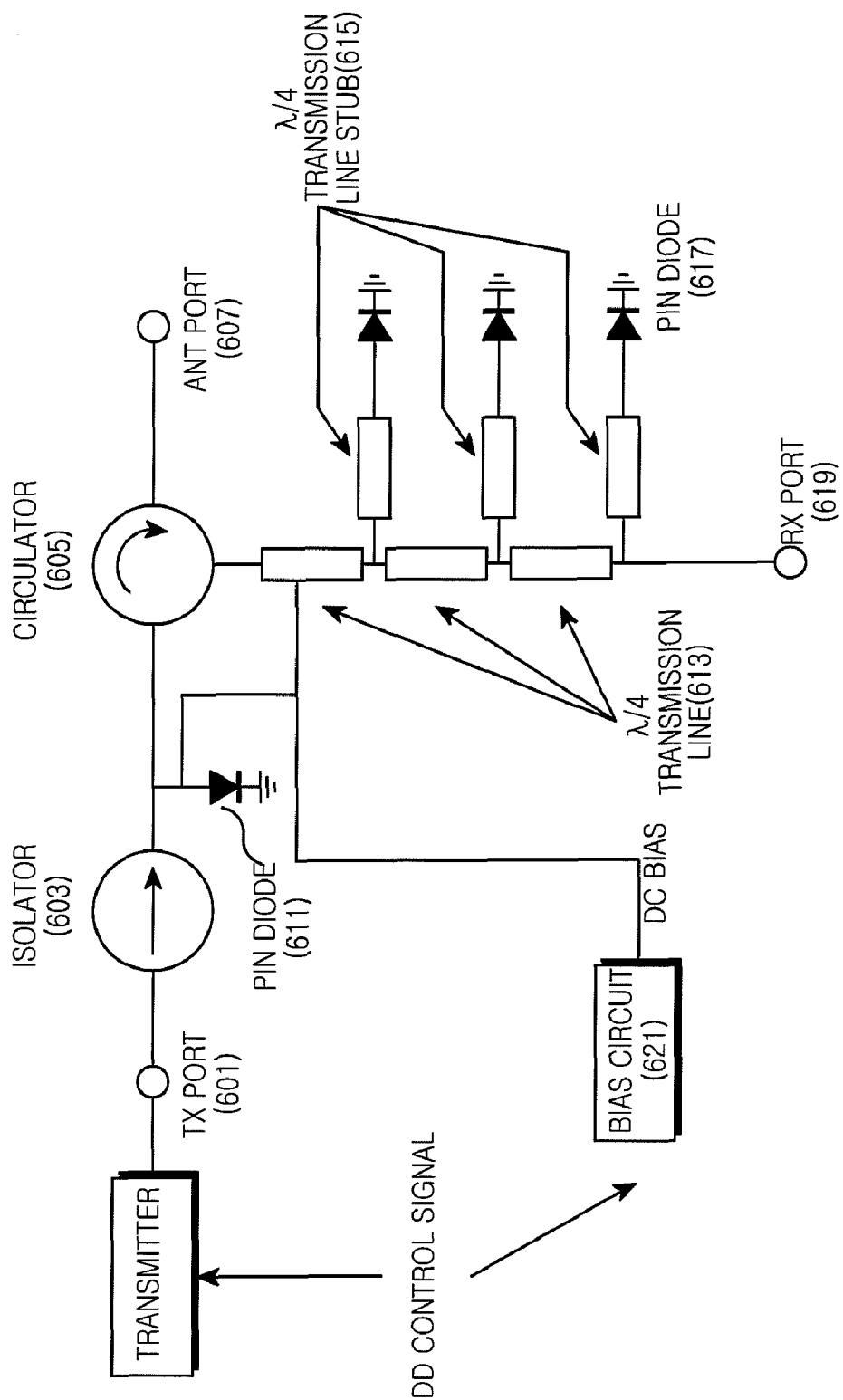
FIG. 6 is a diagram illustrating an exemplary TDD switch having three connection configurations each of which includes a λ/4 transmission line, a λ/4 transmission line stub, and a pin diode, where a λ/2 transmission line stub is absent.

FIG. 6 is a diagram illustrating an exemplary TDD switch having three connection configurations each of which includes a λ/4 transmission line 613, a λ/4 transmission line stub 615, and a pin diode 617. However, in the exemplary embodiment illustrated in FIG. 6, a λ/2 transmission line stub is absent.

In FIG. 6, the configuration of a circuit located between a circulator 605 and a receive port 619 is the same as that of FIG. 5. Similar to FIG. 4, the TDD switch of FIG. 6 does not have the λ/2 transmission line stub. As further illustrated in FIG. 6, the exemplary embodiment also includes a transmission port 601, an isolator 603, an antenna port 607, a PIN diode 611 and a bias circuit 621.

For example, the TDD switch for protecting the receive port 619 may employ the configuration shown in FIG. 4, which is the same as the configuration shown in FIG. 3 except that the λ/2 transmission line stub is absent, when the TDD switch operates in the reception mode while the TDD wireless communication system operates in the transmission mode. Further, the TDD switch for protecting the receive port 619 may employ the configuration shown in FIG. 5, when the TDD switch is turned off.

Accordingly, when the TDD switch operates in the reception mode while the TDD wireless communication system operates in the transmission mode, or when the switch of the TDD wireless communication system is turned off, the circuit of the receiver can be protected.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Time Division Duplex (TDD) switch in a wireless communication system, comprising:
    an isolator connected to an output port of a transmitter;
    a first transmission line stub, connected between the isolator and a circulator, for transmitting a transmission signal received from the isolator when in a transmission mode and for isolating a transmission path when in a reception mode;
    a first transmission line, connected to the circulator, for isolating a reception path when in the transmission mode, and for supplying to a receiver a reception signal provided from an antenna connected to the circulator when in the reception mode;
    a second transmission line stub, connected between the first transmission line and an input port of the receiver, for isolating the reception path when in the transmission mode, and for supplying the reception signal to the receiver when in the reception mode;
    a first pin diode directly connected between the first transmission line stub and ground for switching in response to a TDD control signal; and
    a second pin diode directly connected between the second transmission line stub and ground for switching in response to the TDD control signal.

2. The TDD switch of claim 1, wherein the second transmission line stub isolates the reception path when in the transmission mode by controlling the first transmission line.

3. The TDD switch of claim 1, further comprising a Direct Current (DC) bias circuit for supplying a DC bias to the first and second pin diodes in response to the TDD control signal.

4. The TDD switch of claim 1, wherein the first transmission line stub, the second transmission line stub, and the first transmission line each have a length as follows:
    the length of the first transmission line stub=(λ/2)*a;
    the length of the second transmission line stub=(λ/4)*(2b+1); and
    the length of the first transmission line=(λ/4)*(2c+1),
    where λ is the wavelength of the transmission signal and a, b, c, are integer numbers equal to or greater than 0.

5. The TDD switch of claim 4, wherein the impedance of the first transmission line stub becomes nearly infinite when the first pin diode is turned off and wherein the impedance of the first transmission line stub becomes nearly 0 when the first pin diode is turned on.

6. The TDD switch of claim 4, wherein the impedance of the second transmission line stub becomes nearly 0 when the second pin diode is turned off and wherein the impedance of the second transmission line stub becomes nearly infinite when the second pin diode is turned on.

7. The TDD switch of claim 4,
    wherein the impedance of the first transmission line becomes nearly infinite in the transmission mode, and the transmission path is thus isolated, and
    wherein the impedance of the second transmission line stub becomes nearly infinite in the reception mode, and the reception signal provided from the antenna is thus transmitted to the receiver.

8. The TDD switch of claim 1, wherein the second transmission line stub and the first transmission line are interconnected with one or more connection configurations between the circulator and the receiver.

9. A Time Division Duplex (TDD) switch in a wireless communication system, comprising:
    a transmit port;
    a receive port;
    an antenna;
    a circulator;
    a first transmission line stub, connected between the transmit port and the circulator, for isolating a transmission path from the transmit port when in a reception mode;
    a first transmission line, connected between the circulator and the receive port, for transmitting a signal from the antenna to the receive port when in the reception mode;
    a second transmission line stub, connected between the first transmission line and the receive port, for isolating the first transmission line when in a transmission mode;
    a first pin diode directly connected between the first transmission line stub and ground for switching in response to a TDD control signal; and
    a second pin diode directly connected between the second transmission line stub and ground for switching in response to the TDD control signal.

10. The TDD switch of claim 9, further comprising a Direct Current (DC) bias circuit for supplying a DC bias to the first and second pin diodes in response to the TDD control signal.

11. The TDD switch of claim 9, wherein the first transmission line stub, the second transmission line stub, and the first transmission line each have a length as follows:

the length of the first transmission line stub=$(\lambda/2)*a$;
the length of the second transmission line stub=$(\lambda/4)*(2b+1)$; and
the length of the first transmission line=$(\lambda/4)*(2c+1)$, where $\lambda$ is the wavelength of the transmission signal and a, b, c, are integer numbers equal to or greater than 0.

12. The TDD switch of claim 9, wherein the second transmission line stub and the first transmission line are interconnected with one or more connection configurations between the circulator and the receive port.

13. The TDD switch of claim 12, wherein the impedance of the first transmission line stub becomes nearly infinite when the first pin diode is turned off and wherein the impedance of the first transmission line stub becomes nearly 0 when the first pin diode is turned on.

14. The TDD switch of claim 12, wherein the impedance of the second transmission line stub becomes nearly 0 when the second pin diode is turned off and wherein the impedance of the second transmission line stub becomes nearly infinite when the second pin diode is turned on.

15. The TDD switch of claim 12, wherein the impedance of the first transmission line becomes nearly infinite in the transmission mode and wherein the impedance of the second transmission line stub becomes nearly infinite in the reception mode so that the signal from the antenna is transmitted to the receiver.

* * * * *